United States Patent [19]
Edwards et al.

[11] Patent Number: 6,036,763
[45] Date of Patent: Mar. 14, 2000

[54] KOH NEUTRALIZED METATITANIC ACID MIXTURE AND COMPLEX INORGANIC PIGMENTS CONTAINING THE SAME

[75] Inventors: Thomas V. Edwards, Elyria; William L. Howell, Jr., Wakeman, both of Ohio; Frank A. Mazzella, Rhinebeck, N.Y.

[73] Assignee: Engelhard Corporation, Iselin, N.J.

[21] Appl. No.: 09/173,894

[22] Filed: Oct. 16, 1998

[51] Int. Cl.⁷ .................. C09C 1/36; C04B 14/00
[52] U.S. Cl. ............ 106/436; 106/439; 106/440; 106/441; 106/442; 106/449
[58] Field of Search .................. 106/436, 439, 106/440, 441, 442, 449

[56] References Cited

U.S. PATENT DOCUMENTS

| | | | |
|---|---|---|---|
| 3,022,186 | 2/1962 | Hund | 106/300 |
| 3,969,129 | 7/1976 | Savenkova et al. | 106/433 |
| 4,097,300 | 6/1978 | Balducci et al. | 106/440 |
| 4,272,291 | 6/1981 | Shtern et al. | 106/14.05 |
| 4,849,391 | 7/1989 | Riva et al. | 502/202 |
| 4,885,034 | 12/1989 | Kreth et al. | 106/449 |
| 5,006,175 | 4/1991 | Modly | 106/439 |
| 5,192,365 | 3/1993 | Modly | 106/439 |

FOREIGN PATENT DOCUMENTS 547663  6/1993  European Pat. Off. .

OTHER PUBLICATIONS

Chemical Abstract No. 120:14036, abstract of European Patent Specification No. 547663 (Jun. 1993).

*Primary Examiner*—Anthony Green
*Attorney, Agent, or Firm*—Raymond F. Keller

[57] ABSTRACT

In one embodiment, the present invention relates to a KOH neutralized metatitanic acid mixture containing from about 30% to about 99% by weight metatitanic acid, from about 1% to about 20% by weight of a titanyl compound, and optionally from about 0% to about 55% by weight titanium dioxide, wherein the KOH neutralized metatitanic acid mixture has a pH from about 4 to about 6.5. In another embodiment, the present invention relates to a pigment composition made by combining a KOH neutralized metatitanic acid mixture and at least one guest element precursor, wherein the KOH neutralized metatitanic acid mixture contains metatitanic acid, a titanyl compound, and optionally titanium dioxide, the KOH neutralized metatitanic acid mixture having a pH from about 4 to about 6.5.

22 Claims, No Drawings

KOH NEUTRALIZED METATITANIC ACID MIXTURE AND COMPLEX INORGANIC PIGMENTS CONTAINING THE SAME

TECHNICAL FIELD

This invention generally relates to a KOH neutralized metatitanic acid mixture, Complex Inorganic Color Pigment compositions made from the KOH neutralized metatitanic acid mixture, methods of making and using the KOH neutralized metatitanic acid mixture and Complex Inorganic Color Pigment compositions.

BACKGROUND OF THE INVENTION

Given its high refractive index, lack of absorption of visible light, ability to be produced at a specified size, stability and nontoxicity, pure titanium dioxide is frequently used as a white inorganic pigment. However, irregularities in the crystal lattice correspond to variations in pigment characteristics. For example, while $TiO_2$ is white, $TiO_{1.9995}$ is blue. And different oxides also correspond to variations in pigment characteristics. In particular, TiO is golden yellow, whereas $Ti_2O_3$ is violet.

Titanium dioxide may be used with other components to make a Complex Inorganic Color Pigment (CICP). A CICP is a pigment made by heating a number of different metal oxides. When titanium dioxide is used in CICP formulations, an initial composition containing either calcined titanium dioxide or calcined titanium hydrolysate and other metal oxides is heated. However, there are drawbacks associated with using titanium dioxide or titanium hydrolysate as starting materials in CICP formulations.

Titanium dioxide occurs in nature in three crystalline forms; namely, anatase, brookite and rutile. Although the heated CICP final CICP composition contains titanium dioxide in the rutile form, it is desirable to begin with calcined anatase titanium dioxide (in the initial CICP formulation). This is because calcined anatase titanium dioxide leads to better pigment properties. However, in order to prevent conversion of anatase titanium dioxide into the thermodynamically stable rutile titanium dioxide during precalcining, it is necessary to use a rutile inhibitor. And subsequently, when the CICP formulation is heated, it is necessary to use a rutile promoter to maximize the amount of rutile titanium dioxide formed in the final CICP composition. Use of a rutile inhibitor and rutile promoter is expensive due to the requirement of additional chemicals, more complicated due to requirement of additional processing steps, and undesirable due to poor color control associated with additional chemicals in the CICP formulation.

The use of titanium hydrolysate (hydrated titanium dioxide) in CICP formulations also involves the necessity of including a rutile inhibitor and rutile promoter. This is because from 0.1 to 5% of the initially calcined titanium hydrolysate forms rutile titanium dioxide without a rutile inhibitor. Accordingly, the drawbacks attributable to the expensive and complicated nature of rutile inhibitor/promoter usage are similarly associated with titanium hydrolysate.

When making an initial CICP formulation, it is desirable to prepare alkali metal free formulations. Trapped sodium and potassium undesirably cause sintering when the CICP formulation is heated. Sintering promotes the undesirable formation of coarse aggregate particles which are difficult or impossible to grind. Relatively large, coarse, and/or hard particles often lead to problems in CICP applications. For instance, relatively large, coarse, and/or hard particles tend to cause tears and/or rips in plastic films containing such CICP particles.

SUMMARY OF THE INVENTION

In one embodiment, the present invention relates to a KOH neutralized metatitanic acid mixture containing from about 30% to about 99% by weight metatitanic acid, from about 1% to about 20% by weight of a titanyl compound, and optionally from about 0% to about 55% by weight titanium dioxide, wherein the KOH neutralized metatitanic acid mixture has a pH from about 4 to about 6.5.

In another embodiment, the present invention relates to a method of using a KOH neutralized metatitanic acid mixture involving combining the KOH neutralized metatitanic acid mixture with at least one guest element precursor to form a composition, wherein the KOH neutralized metatitanic acid mixture contains metatitanic acid, a titanyl compound, and optionally titanium dioxide, the KOH neutralized metatitanic acid mixture having a pH from about 4 to about 6.5.

In yet another embodiment, the present invention relates to a pigment composition made by combining a KOH neutralized metatitanic acid mixture and at least one guest element precursor, wherein the KOH neutralized metatitanic acid mixture contains metatitanic acid, a titanyl compound, and optionally titanium dioxide, the KOH neutralized metatitanic acid mixture having a pH from about 4 to about 6.5.

In still yet another embodiment, the present invention relates to a substance, selected from a paint, a coating, an ink, a tape, a plastic, a fiber and a ceramic, containing a pigment composition made by combining a KOH neutralized metatitanic acid mixture and at least one guest element precursor, wherein the KOH neutralized metatitanic acid mixture contains metatitanic acid, a titanyl compound, and optionally titanium dioxide, the KOH neutralized metatitanic acid mixture having a pH from about 4 to about 6.5.

The CICP compositions according to the present invention are surprising due to their high chromatic strength, high dispersability, unexpected softness of the particles, uniform size and spherical shape of the particles, and ease of manufacture.

DETAILED DESCRIPTION OF THE INVENTION

The present invention relates to a KOH neutralized metatitanic acid mixture, CICP compositions made from the KOH neutralized metatitanic acid mixture, methods of making and using the KOH neutralized metatitanic acid mixture and CICP compositions, and plastics, paints and inks containing the CICP compositions. CICP compositions according to the present invention, made with a KOH neutralized metatitanic acid mixture, exhibit numerous advantageous features.

In one embodiment, the present invention relates to a KOH neutralized metatitanic acid mixture and the preparation and use thereof. The KOH neutralized metatitanic acid mixture contains metatitanic acid and a titanyl compound, and optionally titanium dioxide.

Metatitanic acid may be empirically represented as $H_2TiO_3$ or $TiO(OH)_2$. In one embodiment, the KOH neutralized metatitanic acid mixture contains from about 30% to about 99% by weight metatitanic acid. In another embodiment, the KOH neutralized metatitanic acid mixture contains from about 40% to about 95% by weight metatitanic acid. In yet another embodiment, the KOH neutralized metatitanic acid mixture contains from about 50% to about 95% by weight metatitanic acid. In a preferred embodiment, the KOH neutralized metatitanic acid mixture contains from about 40% to about 60% by weight metatitanic acid. In another preferred embodiment, the KOH neutralized metatitanic acid mixture contains from about 92% to about 98% by weight metatitanic acid. Metatitanic acid may be in the rutile or anatase form. However, anatase metatitanic acid is preferred.

Titanyl compounds may be represented by the chemical formula $TiOX_y$, wherein X is an anion and y is 1 or 2. Examples of anions include sulfate wherein y is 1, hydrogen sulfate wherein y is 2, halogens, such as chloride and bromide wherein y is 2, nitrate wherein y is 2, carbonate wherein y is 1, and bicarbonate wherein y is 2. Specific examples of titanyl compounds include titanyl sulfate, titanyl chloride, titanyl bromide, titanyl nitrate, titanyl hydrogen sulfate, titanyl carbonate, and titanyl bicarbonate. In one embodiment, the KOH neutralized metatitanic acid mixture contains from about 1% to about 20% by weight of a titanyl compound. In another embodiment, the KOH neutralized metatitanic acid mixture contains from about 2% to about 15% by weight of a titanyl compound. In yet another embodiment, the KOH neutralized metatitanic acid mixture contains from about 3% to about 10% by weight of a titanyl compound. The titanyl compound may be in the rutile or anatase form. An anatase titanyl compound is preferred.

Titanium dioxide, if present in the KOH neutralized metatitanic acid mixture, may be hydrated, and may be in the rutile or anatase form. If present, anatase titanium dioxide or anatase titanium hydrolysate is preferred. In one embodiment, the KOH neutralized metatitanic acid mixture contains from about 0% to about 55% by weight of titanium dioxide. In another embodiment, the KOH neutralized metatitanic acid mixture contains from about 20% to about 50% by weight of titanium dioxide. In another embodiment, the KOH neutralized metatitanic acid mixture contains from about 25% to about 40% by weight of titanium dioxide.

The KOH neutralized metatitanic acid mixture has a pH from about 4 to about 6.5. The KOH neutralized metatitanic acid mixture and CICP compositions made therefrom have many advantageous properties and characteristics that are, in part, attributable to the pH range of about 4 to about 6.5. Although not wishing to be bound by any theory, when the pH of the KOH neutralized metatitanic acid mixture is greater than about 6.5, it is believed that the amount of potassium in the KOH neutralized metatitanic acid mixture is undesirably high thereby constituting flux and causing sintering problems in subsequent CICP formulations during calcining. Again, although not wishing to be bound by any theory, when the pH of the KOH neutralized metatitanic acid mixture is less than about 4, it is believed that the amount of the anion associated with the titanyl compound is undesirably high thereby degrading the properties of subsequent CICP compositions. In another embodiment, the KOH neutralized metatitanic acid mixture has a pH from about 4.25 to about 6. In yet another embodiment, the KOH neutralized metatitanic acid mixture has a pH from about 4.5 to about 5.5.

The KOH neutralized metatitanic acid mixture is made by adding KOH to a mixture of metatitanic acid and the titanyl compound. The metatitanic acid is preferably in the anatase form. The titanyl compound is also preferably in the anatase form. The mixture of metatitanic acid and the titanyl compound is typically in the form of an aqueous based slurry. If the mixture of metatitanic acid and the titanyl compound is in the powder form, an appropriate amount of water, preferably deionized water, is added to the mixture to form a slurry. A slurry is a relatively thin watery suspension. The pH of the mixture of metatitanic acid and the titanyl compound depends upon the concentration of the slurry (which is not critical, but may be below about 3, and more often below about 2). Methods of making and commercial sources of metatitanic acid and titanyl compounds are known to those skilled in the art.

In one preferred embodiment, the KOH neutralized metatitanic acid mixture has a pH from about 4.5 to about 5 and contains about 95% by weight metatitanic acid and about 5% by weight titanyl sulfate. In another preferred embodiment, the KOH neutralized metatitanic acid mixture has a pH from about 4.5 to about and contains about 45% to about 55% by weight metatitanic acid, about 5% to about 10% by weight titanyl sulfate, and the balance anatase titanium dioxide.

KOH is added, typically in the form of an aqueous solution, in amount sufficient so that the adjusted pH of the slurry is from about 4 to about 6.5. The concentration of the KOH in the solution added to the mixture of metatitanic acid and the titanyl compound is not critical. However, the KOH solution is preferably at least substantially and preferably free of ammonium, alkaline earth metals and sodium compounds such as sodium hydroxide. The slurry is preferably stirred, mixed or agitated while the KOH solution is added. Once the pH of the slurry is properly adjusted, the water is removed by any suitable means known in the art. For instance, water may be removed by evaporation accompanied by gentle heating, or filtration may be performed. A KOH neutralized metatitanic acid mixture is then realized.

Optionally, after the water is removed, the KOH neutralized metatitanic acid mixture is dried, and drying may be performed by any suitable means known in the art, including using an oven, a vacuum or desiccator. In embodiments where an oven is employed, the KOH neutralized metatitanic acid mixture is heated at any temperature up to about 110° C.

The KOH neutralized metatitanic acid mixture is generally in the form of a powder, and preferably a dry powder. The average size of the KOH neutralized metatitanic acid mixture particles of the powder is from about 0.25 microns to about 2 microns. The particle size can be determined using a laser diffraction method. In another embodiment, the average size of the KOH neutralized metatitanic acid mixture particles is from about 0.6 microns to about 1.5 microns. In yet another embodiment, the average size of the KOH neutralized metatitanic acid mixture particles is from about 0.75 microns to about 1.25 microns. In one embodiment, the specific gravity of the KOH neutralized metatitanic acid mixture particles is from about 1.2 g/cm$^3$ to about 1.4 g/cm$^3$. In another embodiment, the specific gravity of the KOH neutralized metatitanic acid mixture particles is from about 1.25 g/cm$^3$ to about 1.35 g/cm$^3$.

The powdered KOH neutralized metatitanic acid mixture is substantially free of alkali metals except potassium. For example, in one embodiment, the KOH neutralized metatitanic acid mixture contains less than about 9000 ppm total potassium and less than about 300 ppm total sodium. In another embodiment, the KOH neutralized metatitanic acid mixture contains less than about 700 ppm total potassium and less than about 225 ppm total sodium. In another embodiment, the KOH neutralized metatitanic acid mixture contains less than about 300 ppm water soluble potassium and less than about 100 ppm water soluble sodium. In yet another embodiment, the KOH neutralized metatitanic acid mixture contains less than about 250 ppm water soluble potassium and no detectable water soluble sodium.

The total metal content refers the amount of metal in the KOH neutralized metatitanic acid mixture which is in solution and in the crystal lattice of the KOH neutralized metatitanic acid. The water soluble metal content refers to the amount of metal in the KOH neutralized metatitanic acid mixture which is in solution. The insoluble metal content refers the amount of metal in the neutralized metatitanic acid which is in the crystal lattice of the KOH neutralized metatitanic acid. The amount of water soluble metal content is determined by combining deionized water and the powdered KOH neutralized metatitanic acid mixture to make a 10% solution (10% by weight of the powdered KOH neutralized metatitanic acid mixture), heating, mixing and allowing the solution to settle, separating the water from the powdered KOH neutralized metatitanic acid mixture, and analyzing the water from the solution.

The amount of metal in the crystal lattice of the KOH neutralized metatitanic acid mixture made in accordance with the present invention is minimized. As a result, pigments made using the KOH neutralized metatitanic acid mixture of the present invention exhibit improved and desirable properties.

In one embodiment, the ratio of the amount of total sodium to total potassium in the KOH neutralized metatitanic acid mixture is from about 1:1.5 to about 1:15, when detectable amounts of sodium are present. In another embodiment, the ratio of the amount of water soluble sodium to water soluble potassium in the KOH neutralized metatitanic acid mixture is from about 1:1.5 to about 1:5, when detectable amounts of water soluble sodium are present. In yet another embodiment, the ratio of the amount of water insoluble sodium to water insoluble potassium in the KOH neutralized metatitanic acid mixture is from about 1:2 to about 1:20, when detectable amounts of water insoluble sodium are present.

In one embodiment, the ratio of the amount of water soluble alkali metal to water insoluble alkali metal in the KOH neutralized metatitanic acid mixture is from about 1:0.5 to about 1:5. In another embodiment, the amount of water insoluble alkali metals in the KOH neutralized metatitanic acid mixture is less than about 700 ppm. In yet another embodiment, the amount of water insoluble alkali metals in the KOH neutralized metatitanic acid mixture is less than about 400 ppm.

The surface area of the KOH neutralized metatitanic acid mixture particles is from about 125 $m^2/g$ to about 225 $m^2/g$, but at least about 125 $m^2/g$. In another embodiment, the surface area of the KOH neutralized metatitanic acid mixture particles is from about 150 $m^2/g$ to about 200 $m^2/g$, but at least about 150 $m^2/g$. In yet another embodiment, the surface area of the KOH neutralized metatitanic acid mixture particles is from about 160 $m^2/g$ to about 190 $m^2/g$, but at least about 160 $m^2/g$.

The KOH neutralized metatitanic acid mixture may be used to make pigments, and in particular CICPs, and preferably titania based CICPs. The pigments made using the KOH neutralized metatitanic acid mixture include suitable inorganic pigments containing titanium dioxide or other titanium compounds. The KOH neutralized metatitanic acid mixture is simply used in place of titanium dioxide to make the inorganic pigments. CICPs are similar to titania based CICPs except that a compound other than titanium is the host element. Again, the KOH neutralized metatitanic acid mixture is simply used in place of titanium dioxide to make the non-titanium based CICPs.

In titania based CICPs, titania is the host element (larger amounts of titania than any other element) and additional oxides are one or more guest elements. CICP systems include yellow CICPs such as Ti-Ni-Sb, Ti-Ni-W, Ti-Ni-Nb and Ti-Ni-Ca-Sb; teal blue CICPs such as Ti-Co-Li; green CTCPs such as Ti-Co-Ni-Li; brown CICPs such as Ti-Mn-Sb, Ti-Mn-W and Ti-Mn-Nb; orange CICPs such as Ti-Cr-Nb and Ti-CrW; buff CICPs such as Ti-W-Co; and other CICPs such as Ti-Al-Fe. Guest elements in titania based CICPs include Ni, Sb, W, Nb, Co, Li, Mn, Sr, Ce, V, Cu, Mg, As, Bi, Cd, Se, Hg, Ba and Cr.

CICPs are made by combining the KOH neutralized metatitanic acid mixture with one or more guest element precursors and mixing to form a CICP formulation. Guest element precursors include Ni compounds, Sb compounds, W compounds, Nb compounds, Co compounds, Li compounds, Mn compounds, Sr compounds, Ce compounds, V compounds, Cu compounds, Mg compounds, As compounds, Al compounds, Fe compounds, Bi compounds, Cd compounds, Se compounds, Hg compounds, Ba compounds and Cr compounds and specifically include the corresponding hydroxides, carbonates, bicarbonates, acids, salts, halides, acetates, nitrates, formates, and oxides of Ni, Sb, W, Nb, Co, Li, Mn, Sr, Ce, V, Cu, Mg, As, Al, Fe, Bi, Cd, Se, Hg, Ba and Cr.

Specific examples of guest element precursors include Sb chloride, fluoride, bromide, iodide, and oxide; As chloride, bromide, iodide, and oxide; Al chloride, fluoride, bromide, iodide, acetate, hydroxide, nitrate, and oxide; Ba chloride, fluoride, bromide, iodide, acetate, carbonate, nitrate, and oxide; Bi chloride, fluoride, bromide, iodide, acetate, carbonate, nitrate, and oxide; Cd chloride, fluoride, bromide, iodide, acetate, carbonate, nitrate, hydroxide, and oxide; Ce chloride, fluoride, bromide, iodide, acetate, formate, carbonate, nitrate, and oxide; Cr chloride, fluoride, bromide, iodide, acetate, nitrate, hydroxide, and oxide; Co chloride, fluoride, bromide, iodide, acetate, carbonate, nitrate, and oxide; Cu chloride, fluoride, bromide, iodide, acetate, carbonate, nitrate, and oxide; Fe chloride, fluoride, bromide, iodide, acetate, nitrate, and oxide; Li chloride, fluoride, bromide, iodide, acetate, carbonate, nitrate, and oxide; Mg chloride, fluoride, bromide, iodide, acetate, carbonate, nitrate, hydroxide, and oxide; Mn chloride, fluoride, bromide, iodide, acetate, carbonate, nitrate, and oxide; Hg chloride, fluoride, bromide, iodide, acetate, nitrate, and oxide; Ni chloride, fluoride, bromide, iodide, acetate, carbonate, nitrate, and oxide; Nb chloride, fluoride, bromide, and oxide; Se chloride and oxide; Sr chloride, fluoride, bromide, iodide, acetate, carbonate, nitrate, and oxide, tungstic acid, and ammonium metatungstate,; W chloride, fluoride, bromide, and oxide; and V chloride, fluoride, bromide, iodide, and oxide.

In one embodiment, from about 10% to about 90% by weight of the KOH neutralized metatitanic acid mixture is combined with from about 90% to about 10% by weight one or more guest element precursors. In another embodiment, from about 60% to about 90% by weight of the KOH neutralized metatitanic acid mixture is combined with from about 10% to about 40% by weight one or more guest element precursors. This embodiment is preferred in making a rutile pigment. In yet another embodiment, from about 10% to about 40% by weight of the KOH neutralized metatitanic acid mixture is combined with from about 60% to about 90% by weight one or more guest element precursors. This embodiment is preferred in making a inverse spinel pigment. In one embodiment, two or more guest element precursors are combined with the KOH neutralized metatitanic acid mixture. In another embodiment, three or more guest element precursors are combined with the KOH neutralized metatitanic acid mixture.

The CICP formulation is then heated to a calcination temperature to form a solid solution in the form of a powder. During heating an unexpectedly high amount of the KOH neutralized metatitanic acid mixture is converted to titanium dioxide and substantially all of the one or more guest element precursors are converted to their corresponding oxides. The Loss-on-Ignition (LOI) is a measure of the relative amount of a substance which is converted to its corresponding oxide during calcination. The LOI of the CICP formulations according to the present invention are typically from about 85% to about 90% titanium dioxide by weight. This is an improvement over using titanium dioxide or titanium hydrolysate to make CICP compositions, which have low LOI values, such as below about 80%.

Calcination can be performed using any suitable apparatus known in the art such as a rotary kiln, tunnel kiln, verticle calciner, high temperature cyclone, and the like. The calcination temperature is generally from about 850° C. to about 1300° C. In another embodiment, the calcination temperature is generally from about 900° C. to about 1200° C. In yet another embodiment, the calcination temperature is generally from about 930° C. to about 1100° C. The formulation is heated for a sufficient period of time at the calcination temperature to form a solid solution. In one embodiment, the formulation is heated from about 1 to about 5 hours. In another embodiment, the formulation is heated from about 1.5 to about 4 hours.

The resultant CICP composition, which is typically in powdered form, may be processed to reduce particle sizes or particle size ranges to more useful sizes or more useful size ranges. Any suitable apparatus normally used for the mechanical agitation of solid materials may be utilized including mixers, rotating cylinders, tumbling barrels, ball mills, hammer mills, and the like. In many instances, application of shear mixing is sufficient to disperse and/or reduce particle sizes.

The resultant CICP composition contains particles having an average size from about 0.01 microns to about 1.5 microns. In another embodiment, the CICP composition contains particles having an average size from about 0.1 microns to about 1.2 microns. In yet another embodiment, the CICP composition contains particles having an average size from about 0.25 microns to about 1 micron.

The resultant CICP composition contains particles having a substantially spherical shape and substantially uniform size. In one embodiment, the average size deviation (average deviation from the average size) is less than about 0.3 microns. In another embodiment, the average size deviation is less than about 0.2 microns. In another embodiment, the average size deviation is less than about 0.1 microns. The particles are further characterized by a fine texture, as opposed to a rough texture.

As a result of the substantially uniform size and substantially spherical shape of the particles, flow characteristics are markedly improved compared to conventional CICP compositions. Also as a result of the substantially uniform size and substantially spherical shape of the particles, the particles tend not to agglomerate or aggregate. Decreased agglomeration and/or aggregation leads to reduced residue levels. The resultant CICP composition contains particles which are relatively soft, thus requiring less force to pulverize and disperse the powder.

In the resultant CICP compositions, the titanium dioxide formed from the KOH neutralized metatitanic acid mixture during calcination is predominantly in the rutile form, although in some instances all or a portion of the titanium dioxide may be in the inverse spinel form. The guest element precursors are converted to their corresponding oxides at varying degrees, depending upon the identity of the guest element precursor, and the identity and relative amounts of the other components of the CICP formulation.

In one embodiment, more than about 95% of the titanium dioxide formed is in the rutile form. In another embodiment, more than about 98% of the titanium dioxide formed is in the rutile form. In another embodiment, more than about 99.5% of the titanium dioxide formed is in the rutile form.

In one embodiment, more than about 50% of the titanium dioxide formed is in the inverse spinel form. In another embodiment, more than about 75% of the titanium dioxide formed is in the inverse spinel form. In another embodiment, more than about 90% of the titanium dioxide formed is in the inverse spinel form.

The CICP compositions according to the present invention can be incorporated into any material requiring color. Examples of materials in which CICP compositions may be incorporated include paints, coatings, inks, tapes, plastics, fibers, ceramics, and the like. Specific examples of inks include printing inks and lacquers, and specific examples of plastics include thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polycarbonates, polyurethanes, polyesters, for example polyglycol terephthalates, and polyacrylonitrile. It is also useful for pigment printing and for the pigmenting of paper in the mass.

See, for example, with regard to ink: R. H. Leach, editor, *The Printing Ink Manual,* Fourth Edition, Van Nostrand Reinhold (International) Co. Ltd., London (1988), particularly pages 282–591; with regard to paints: C. H. Hare, *Protective Coatings,* Technology Publishing Co., Pittsburgh (1994), particularly pages 63–288; and with regard to plastics: T. G. Webber, *Coloring of Plastics.* John Wiley & Sons, New York (1979), particularly pages 79–204. The foregoing references are hereby incorporated by reference herein for their teachings of ink, paint and plastic compositions, formulations and vehicles in which the CICP compositions of this invention may be used including amounts of colorants.

There are a number of advantages associated with the CICP compositions according to the present invention, made with KOH neutralized metatitanic acid. For example, compared to using titanium oxide or titanium hydrolysate, manufacture of CICP compositions is simplified since vigorous milling after calcining is not required. Also, the requirement of using a rutile inhibitor and promoter is eliminated. Since metatitanic acid is more reactive than titanium oxide or titanium hydrolysate, the time required to calcine the CICP formulation is reduced. These advantages lead to significant cost savings when comparing making CICP compositions according to the invention versus conventional manufacture.

Using the KOH neutralized metatitanic acid mixture to make CICP compositions substantially eliminates the undesirable occurrence of rutile titanium dioxide particles in the initial CICP formulation. The occurrence of rutile titanium dioxide particles in the initial CICP formulation leads to white rutile contaminant in the resultant CICP compositions which decreases pigment strength and intensity in the resultant CICP compositions as well as increasing the amount of coarse, large particles in the resultant CICP compositions that cause problems in the materials requiring color. The white rutile contaminant typically has a particle size of 20 microns or greater, and even 100 microns or greater.

Especially when incorporated in film or fiber forming materials, such as paints, coatings, and thin plastics, the CICP compositions according to the present invention display strong, bright colors while not degrading the integrity and uniformity of the resultant films and fibers. The CICP compositions not degrading the integrity and uniformity of the resultant films and fibers which can be as thin as 3 mils, 2 mils, and even 0.5 mils.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A KOH neutralized metatitanic acid mixture comprising from about 30% to about 99% by weight metatitanic acid, from about 1% to about 20% by weight of a titanyl compound, and optionally from about 0% to about 55% by weight titanium dioxide, wherein the KOH neutralized metatitanic acid mixture has a pH from about 4 to about 6.5.

2. The KOH neutralized metatitanic acid mixture according to claim 1, wherein the metatitanic acid comprises anatase metatitanic acid.

3. The KOH neutralized metatitanic acid mixture according to claim 1, wherein the titanyl compound comprises titanyl chloride.

4. The KOH neutralized metatitanic acid mixture according to claim 1, wherein the KOH neutralized metatitanic acid mixture has a pH from about 4.25 to about 6.

5. The KOH neutralized metatitanic acid mixture according to claim 1 comprising from about 40% to about 95% by weight metatitanic acid and from about 2% to about 15% by weight of the titanyl compound, and optionally from about 0% to about 50% by weight titanium dioxide. titanium dioxide, the KOH neutralized metatitanic acid mixture having a pH from about 4 to about 6.5.

6. The KOH neutralized metatitanic acid mixture according to claim 1, wherein the titanyl compound comprises titanyl sulfate.

7. A method of using a KOH neutralized metatitanic acid mixture to form a composition, the method comprising combining from about 10% to about 90% by weight of the KOH neutralized metatitanic acid mixture with from about 10% to about 90% by weight of at least one guest element precursor to form the composition, wherein the KOH neutralized metatitanic acid mixture comprises from about 30% to about 99% by weight of metatitanic acid, from about 1% to about 20% by weight of a titanyl compound, and optionally from about 0% to about 55% by weight of titanium dioxide, the KOH neutralized metatitanic acid mixture having a pH from about 4 to about 6.5, and the guest element precursor is selected from the group consisting of Ni compounds, Sb compounds, W compounds, Nb compounds, Co compounds, Li compounds, Mn compounds, Sr compounds, Ce compounds, V compounds, Cu compounds, Mg compounds, As compounds, Al compounds, Fe compounds, Bi compounds, Cd compounds, Se compounds. Hg compounds, Ba compounds and Cr compounds.

8. The method of using the KOH neutralized metatitanic acid mixture according to claim 7 further comprising calcining the composition at a temperature from about 850° C. to about 1300° C.

9. The method of using the KOH neutralized metatitanic acid mixture according to claim 8, wherein calcining is performed from about 1 hour to about 5 hours.

10. The method of using the KOH neutralized metatitanic acid mixture according to claim 7, wherein the guest element precursor is selected from the group consisting of hydroxides, carbonates, bicarbonates, acids, salts, halides, acetates, nitrates, formates, and oxides of Ni, Sb, W, Nb, Co, Li, Mn, Sr, Ce, V, Cu, Mg, As, Al, Fe, Bi, Cd, Se, Hg, Ba and Cr.

11. A pigment composition made by combining from about 10% to about 90% by weight of a KOH neutralized metatitanic acid mixture and from about 10% to about 90% by weight of at least one guest element precursor, wherein the KOH neutralized metatitanic acid mixture comprises from about 30% to about 99% by weight of metatitanic acid, from about 1% to about 20% by weight of a titanyl compound, and optionally from about 0% to about 55% by weight of titanium dioxide, the KOH neutralized metatitanic acid mixture having a pH from about 4 to about 6.5, and the guest element precursor is selected from the group consisting of Ni compounds, Sb compounds, W compounds, Nb compounds, Co compounds, Li compounds, Mn compounds, Sr compounds, Ce compounds, V compounds, Cu compounds, Mg compounds, As compounds, Al compounds, Fe compounds, Bi compounds, Cd compounds, Se compounds. Hg compounds, Ba compounds and Cr compounds.

12. The pigment composition according to claim 11, wherein the KOH neutralized metatitanic acid mixture comprises from about 30% to about 99% by weight metatitanic acid, from about 1% to about 20% by weight of the titanyl compound, and optionally from about 0% to about 55% by weight titanium dioxide.

13. The pigment composition according to claim 11, wherein the KOH neutralized metatitanic acid mixture comprises anatase metatitanic acid.

14. The pigment composition according to claim 11, wherein the titanyl compound comprises titanyl chloride.

15. The pigment composition according to claim 11, wherein the guest element precursor is selected from the group consisting of hydroxides, carbonates, bicarbonates, acids, salts, halides, acetates, nitrates, formates, and oxides of Ni, Sb, W, Nb, Co, Li, Mn, Sr, Ce, V, Cu, Mg, As, Al, Fe, Bi, Cd, Se, Hg, Ba and Cr.

16. The pigment composition according to claim 11, wherein the pigment composition is made by combining from about 60% to about 90% by weight of the KOH neutralized metatitanic acid mixture and from about 40% to about 10% by weight of the at least one guest element precursor.

17. The pigment composition according to claim 11, wherein the pigment composition is made by combining at least two guest element precursors.

18. The pigment composition according to claim 11, wherein the pigment composition is in powder form comprising particles having an average size from about 0.01 microns to about 1.5 microns.

19. The pigment composition according to claim 11, wherein the titanyl compound comprises titanyl sulfate.

20. A substance, selected from the group consisting of a paint, a coating, an ink, a tape, a plastic, a fiber and a ceramic, comprising a pigment composition made by combining from about 10% to about 90% by weight of a KOH neutralized metatitanic acid mixture and from about 10% to about 90% by weight of at least one guest element precursor, wherein the KOH neutralized metatitanic acid mixture comprises from about 30% to about 99% by weight of metatitanic acid, from about 1% to about 20% by weight of a titanyl compound, and optionally from about 0% to about 55% by weight of titanium dioxide, the KOH neutralized metatitanic acid mixture having a pH from about 4 to about 6.5, and the guest element precursor is selected from the group consisting of Ni compounds, Sb compounds, W compounds, Nb compounds, Co compounds, Li compounds, Mn compounds, Sr compounds, Ce compounds, V compounds, Cu compounds, Mg compounds, As compounds, Al compounds, Fe compounds, Bi compounds, Cd compounds, Se compounds, Hg compounds, Ba compounds and Cr compounds.

21. The substance according to claim 20, wherein the substance comprises paint.

22. The substance according to claim 20, wherein the substance comprises a plastic.

* * * * *